United States Patent
Wipasuramonton et al.

(10) Patent No.: US 8,789,846 B2
(45) Date of Patent: Jul. 29, 2014

(54) AIRBAG DEVICE

(71) Applicant: TK Holdings Inc., Auburn Hills, MI (US)

(72) Inventors: Pongdet Paul Wipasuramonton, Rochester, MI (US); Neil Alan Teichman, Linden, MI (US); Mark Andrew Steinbach, Clawson, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/787,445

(22) Filed: Mar. 6, 2013

(65) Prior Publication Data

US 2013/0234422 A1    Sep. 12, 2013

Related U.S. Application Data

(60) Provisional application No. 61/608,019, filed on Mar. 7, 2012.

(51) Int. Cl.
| | |
|---|---|
| *B60R 21/214* | (2011.01) |
| *B60R 21/2338* | (2011.01) |
| *B60R 21/232* | (2011.01) |
| *B60R 21/23* | (2006.01) |

(52) U.S. Cl.
CPC .............. *B60R 21/23* (2013.01); *B60R 21/2338* (2013.01); *B60R 2021/23386* (2013.01); *B60R 21/232* (2013.01)
USPC ..................................... 280/730.2; 280/743.1

(58) Field of Classification Search
USPC ...................................................... 280/730.2
See application file for complete search history.

(56) References Cited

U.S. PATENT DOCUMENTS

| | | | | |
|---|---|---|---|---|
| 5,636,862 A * | 6/1997 | Cheung et al. | ............. | 280/730.2 |
| 5,730,464 A * | 3/1998 | Hill | ............................ | 280/743.2 |
| 6,877,771 B2 * | 4/2005 | Weber | ........................... | 280/742 |
| 7,240,915 B2 * | 7/2007 | Peng et al. | ................. | 280/730.2 |
| 7,549,672 B2 * | 6/2009 | Sato et al. | .................. | 280/730.2 |
| 7,712,768 B2 | 5/2010 | Fukuda et al. | | |
| 7,823,922 B2 * | 11/2010 | Mitchell et al. | ............ | 280/743.2 |
| 7,828,322 B2 * | 11/2010 | Breuninger et al. | ....... | 280/730.2 |
| 7,922,193 B2 * | 4/2011 | Breuninger et al. | ....... | 280/730.2 |
| 7,942,444 B2 * | 5/2011 | Steinbach et al. | .......... | 280/743.2 |

(Continued)

FOREIGN PATENT DOCUMENTS

EP            1 693 256 A1    8/2006

OTHER PUBLICATIONS

International Search Report and Written Oppinion dated Jun. 14, 2013 in connection with International Application No. PCT/US2013/029440.

*Primary Examiner* — Nicole Verley
(74) *Attorney, Agent, or Firm* — Foley & Lardner LLP

(57) ABSTRACT

An airbag device configured to deploy along an interior side of a passenger compartment of a vehicle may include a gas generator and an inflatable airbag. The inflatable airbag may include a plurality of inflatable chambers configured to be inflated by the gas generator. A first inflatable chamber may be tethered to at least a second inflatable chamber by a connection member. The airbag may be configured so that when the airbag is inflated the connection member restrains the separation of the first and second inflatable chambers and forces at least one of the inflatable chambers inboard so that the plurality of inflatable chambers form a convex profile along a plane perpendicular to the side of the passenger compartment.

18 Claims, 4 Drawing Sheets

(56) References Cited

U.S. PATENT DOCUMENTS

| | | |
|---|---|---|
| 8,322,748 B2 * | 12/2012 | Abe et al. .................. 280/739 |
| 8,480,125 B1 * | 7/2013 | Belwafa et al. ............ 280/730.2 |
| 2005/0082797 A1 * | 4/2005 | Welford et al. ............ 280/730.2 |
| 2005/0104343 A1 * | 5/2005 | Levine ....................... 280/730.2 |
| 2005/0194769 A1 | 9/2005 | Abe |
| 2006/0273558 A1 * | 12/2006 | Breed et al. ................ 280/730.2 |
| 2007/0108745 A1 * | 5/2007 | Belwafa et al. ............ 280/730.2 |
| 2010/0244415 A1 | 9/2010 | Wipasuramonton et al. |

* cited by examiner

US 8,789,846 B2

AIRBAG DEVICE

CROSS REFERENCE TO RELATED APPLICATION

This application claims priority to and benefit from U.S. Provisional Application Ser. No. 61/608,019, filed Mar. 7, 2012, which is hereby incorporated by reference in its entirety.

BACKGROUND

The present invention relates generally to the field of airbags and occupant protection systems. More specifically, the invention relates to airbags with a connection member for improved occupant protection performance.

Head-Side Airbags (HSABs) have generally been designed based on a vehicle's occupant seating location. Each occupant's head has typically been protected by an inflated cushion chamber. In earlier designs, the cushion typically was designed with a series of vertically coplanar chambers with the purpose of occupant protection during a side impact and/or roll over event. A frontal impact and/or frontal offset impact to the vehicle may cause the occupant to travel towards the corresponding A-pillar. Thus, these cushions should also protect the occupant during frontal impact and/or frontal offset impact events.

U.S. Pat. No. 7,942,444 discloses airbag devices that include head-side airbags, and is hereby incorporated by reference in its entirety. The present invention discloses how the basic structure and arrangement of a head side airbag, such as the exemplary airbags disclosed in U.S. Pat. No. 7,942,444, can be improved and modified to include features and configurations disclosed herein.

SUMMARY

According to one disclosed embodiment, an airbag device is configured to deploy along an interior side of a passenger compartment of a vehicle and includes a gas generator and an inflatable airbag. The inflatable airbag may include a plurality of inflatable chambers configured to be inflated by the gas generator. A first inflatable chamber may be tethered to at least a second inflatable chamber by a connection member. The airbag may be configured so that when the airbag is inflated the connection member restrains the separation of the first and second inflatable chambers and forces at least one of the inflatable chambers inboard so that the plurality of inflatable chambers form a convex profile along a plane perpendicular to the side of the passenger compartment.

According to another disclosed embodiment, an occupant protection system includes a head-side airbag, a frontal airbag, and a gas generator. The head-side airbag may include a plurality of inflatable chambers configured to be inflated by the gas generator. A first inflatable chamber may be tethered to at least a second inflatable chamber by a connection member. The head-side airbag may be configured so that when the head-side airbag is inflated the connection member restrains the separation of the first and second inflatable chambers and forces at least one of the inflatable chambers inboard so that the plurality of inflatable chambers form a convex profile along a plane perpendicular to the side of the passenger compartment.

According to another disclosed embodiment, an airbag device configured to deploy along an interior side of a passenger compartment of a vehicle may include a gas generator and an inflatable airbag. The inflatable airbag may include at least three inflatable chambers configured to be inflated by gas provided by the gas generator. A forward inflatable chamber may be tethered to at least a rearward inflatable chamber by a connection member. The forward and rearward inflatable chambers may be separated by at least an intermediate inflatable chamber so that when the airbag is inflated the connection member restrains the separation of the forward and rearward inflatable chambers and forces the intermediate inflatable chambers inboard and the forward, intermediate, and rearward inflatable chambers form a convex profile along a plane perpendicular to the side of the passenger compartment.

It is to be understood that both the foregoing general description and the following detailed descriptions are exemplary and explanatory only, and not restrictive of the inventions as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the airbag disclosed herein are configured to provide improved coverage and protection against occupant contact with an A-pillar of a vehicle during a frontal impact or frontal offset impact while maintaining current side impact and roll over protection. According to one embodiment, an inflatable chamber protrudes into the occupant compartment to direct an occupant inward, away from the A-pillar. According to another embodiment, a cushion including an inflatable chamber protruding into the occupant compartment is preloaded by an occupant impacting the protruding chamber, thereby increasing impact energy absorption earlier in an impact.

Figure 1:
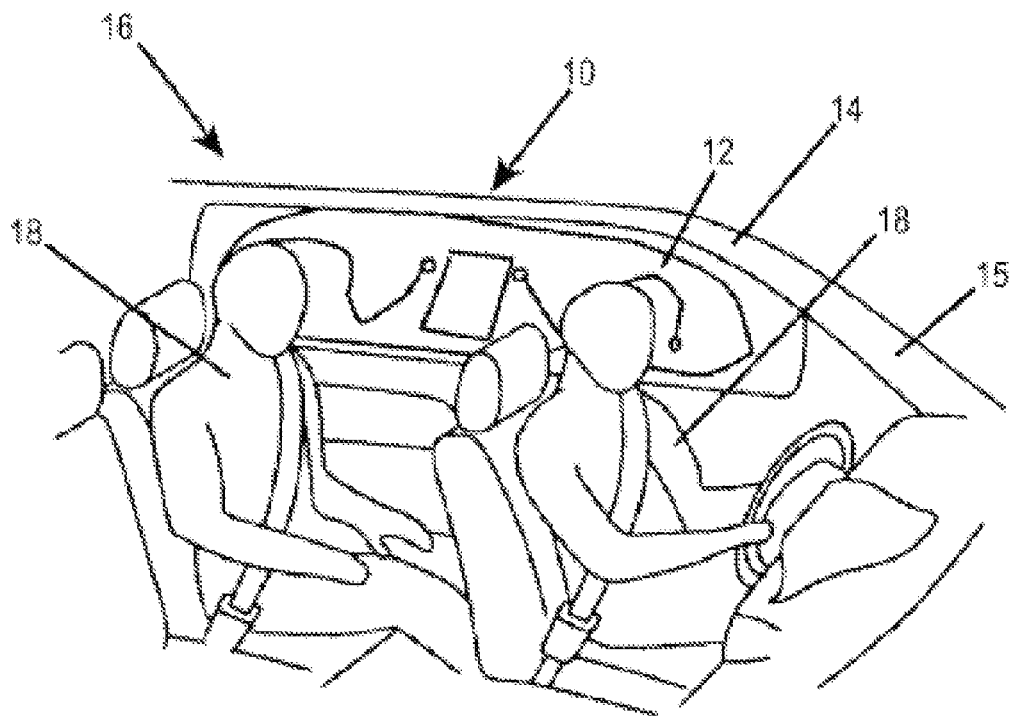
FIG. 1 is a perspective view of a side impact airbag device deployed in the interior of a vehicle, according to an exemplary embodiment.

FIG. 1 is a perspective view of an airbag device 10 deployed in a vehicle interior (e.g., occupant compartment, etc.). The airbag device 10 may include an airbag cushion 12 inflated by an inflator or gas generator and at least one connection element coupled between the airbag cushion and a structural member of the vehicle. The airbag 12 may be a head-side airbag (HSAB) configured to be positioned in a roof rail 14 of a vehicle 16. During a side impact, roll over, frontal impact or frontal offset impact event involving the vehicle 16, sensors trigger the inflator or gas generator, which may be located in the roof rail 14 or roof assembly, to rapidly generate and force gas into the airbag cushion 12. The airbag deploys downwardly along the side of the occupant compartment toward the vehicle occupants 18 and expands in the cross-car direction as gas is forced into the cushion 12 by the inflator.

Figure 2:
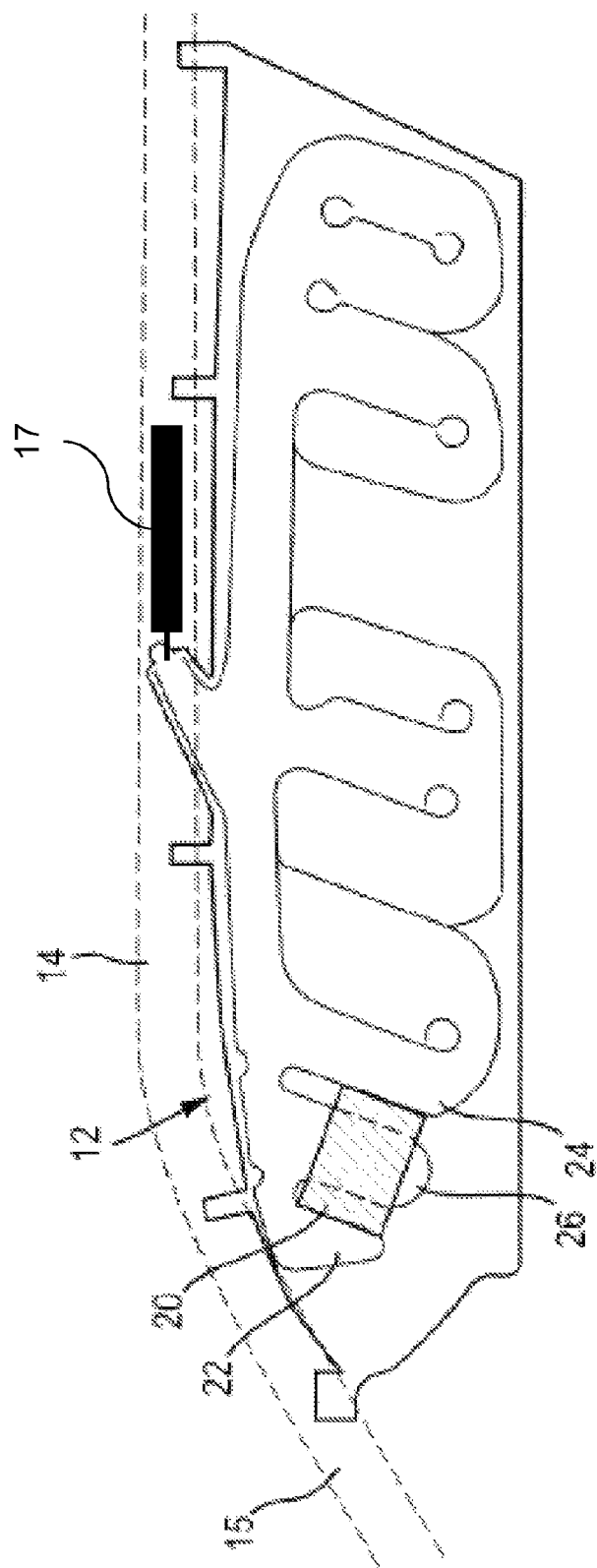
FIG. 2 is a side view of an airbag cushion in a flattened, uninflated state, according to an exemplary embodiment.
Figure 4:
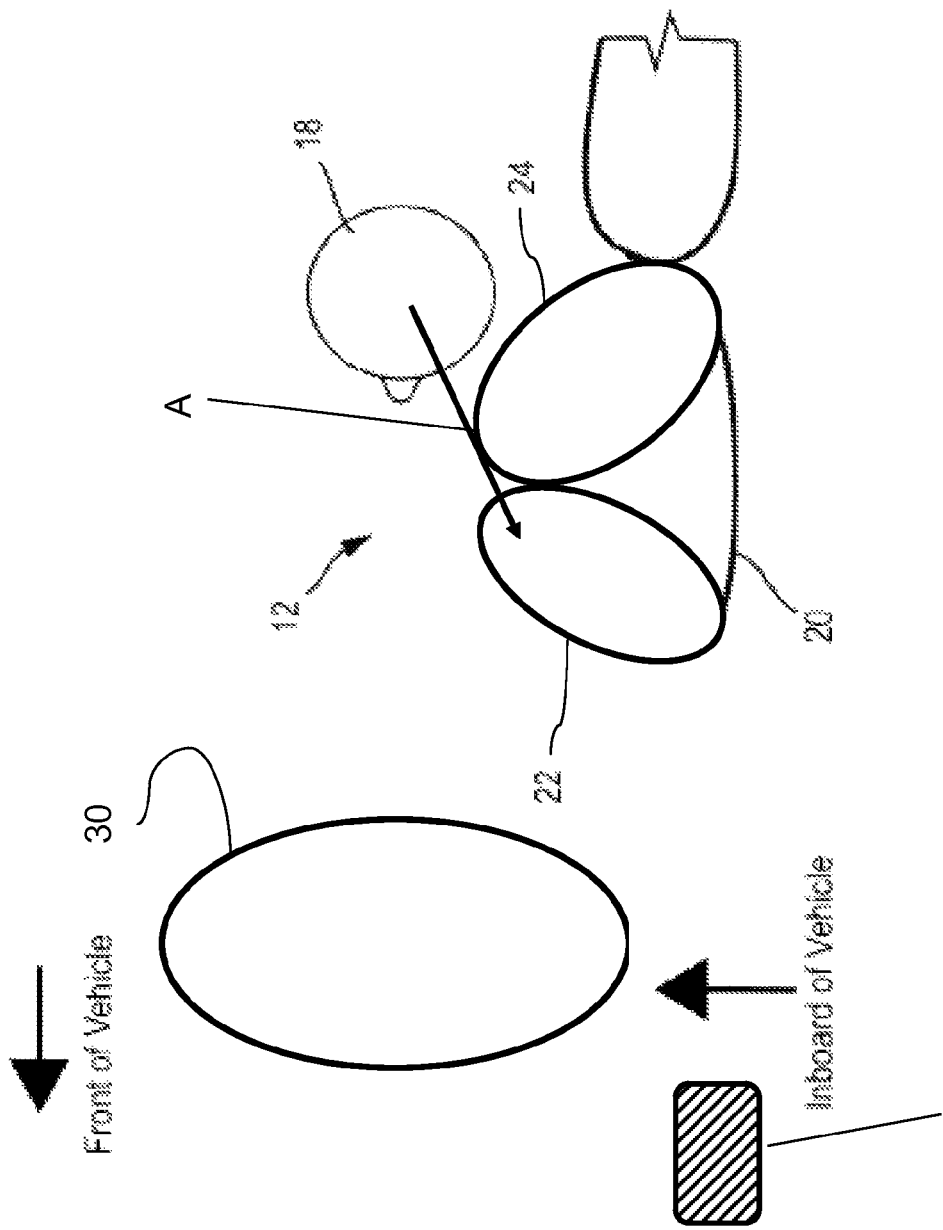
FIG. 4 is a cross section of a portion of an occupant protection system in an inflated state, according to an exemplary embodiment.

Referring to FIG. 2, the back, or outboard, side of an embodiment of an exemplary airbag cushion 12 is shown in a flattened, uninflated state. The cushion 12 includes a multitude of substantially vertically extending inflatable chambers. The inflatable chambers are inflated by a gas generator 17. A connection member or tether 20 is coupled between two or more adjacent inflatable chambers such that the chambers create a convex profile along a plane perpendicular to the side of the compartment when the airbag cushion 12 is inflated. According to an exemplary embodiment, the connection member 20 is a panel of fabric that is attached to the seams forming a perimeter of a forward chamber 22 and a rearward chamber 24. The connection member 20 extends over but is not coupled to one or more intermediate chambers 26. Or, as shown in FIG. 4, the intermediate chamber may be completely omitted.

Figure 3:
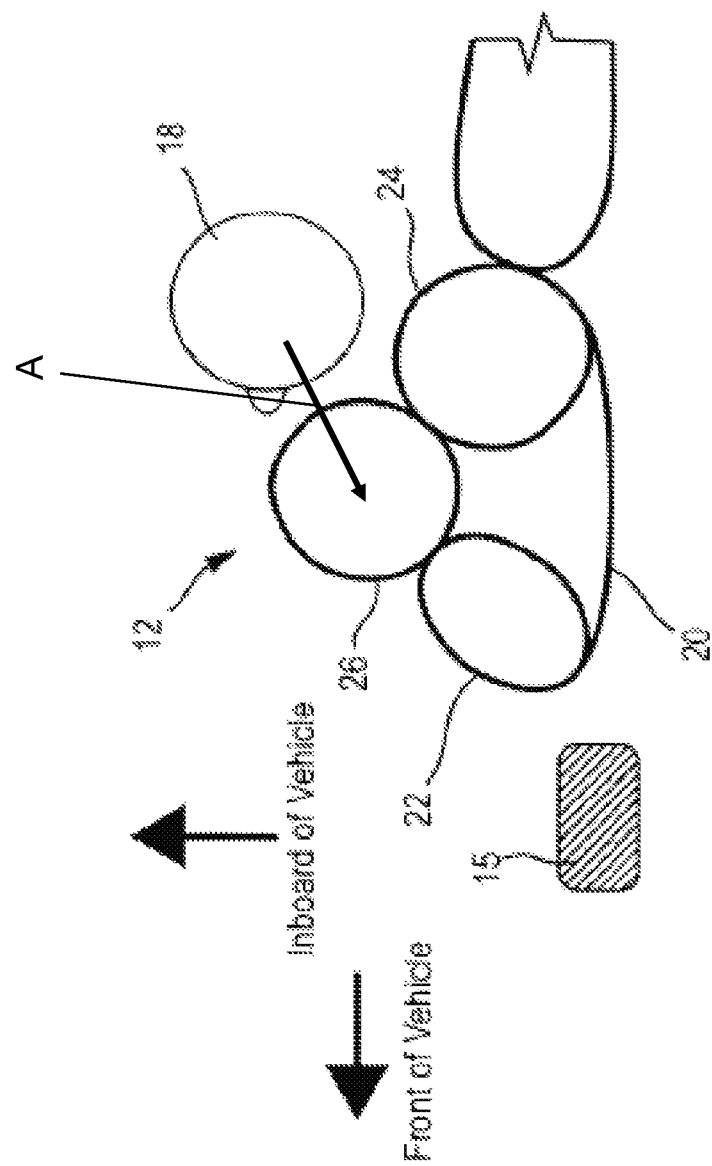
FIG. 3 is a cross section of a portion of the airbag cushion of FIG. 2 in an inflated state, according to an exemplary embodiment.

Referring to FIG. 3, a cross-section of the forward portion of the airbag cushion 12 is shown in an inflated state. As the cushion 12 inflates, the distance between the forward chamber 22 and the rearward chamber 24 is prevented from increasing by the connection member 20 that is coupled between chambers 22 and 24. The intermediate chamber 26 is forced inboard, and protrudes into the occupant compartment. The shape of the airbag cushion 12 causes the protruding or offset intermediate chamber 26 to be disposed between the occupant 18 and the vehicle A-pillar 15. The airbag cushion 12 may therefore guide the occupant away from the A-pillar 15 and toward a corresponding deploying frontal airbag.

If the occupant 18 contacts the protruding intermediate chamber 26 during a lateral impact (e.g., a side vehicle impact or roll over event), the occupant is preloaded by the airbag cushion 12 and energy is absorbed earlier. The protruding intermediate chamber 26 is positioned closer to the occupant 18, allowing the cushion 12 to contact and absorb energy from the occupant 18 earlier in the impact event. Thus, the protruding intermediate chamber 26 may improve the energy management capabilities of the airbag cushion and may reduce the excursion distance of the occupant in a lateral impact event.

Further, the airbag cushion 12 as shown in the figures with a connection member 20 causing one or more intermediate chambers 26 to protrude may, in certain circumstances, increase the ability of the airbag device 10 to retain the occupant in the vehicle and prevent the occupant from ejecting from the occupant compartment during a side impact and/or roll over event. The direction of the occupant is shown generally in the drawings by the reference numeral A.

While the connection member 20 is shown as a single component, in other embodiments, the connection member 20 may include multiple components (e.g., multiple strips of fabric coupled between the chambers 22 and 24). The connection member 20 may be any suitable tether, such as a strap, a cable a cord, a fabric strip, and a fabric panel. The connection member 20 may extend over multiple intermediate chambers 26 so that multiple chambers of the inflated airbag cushion 12 protrude into the occupant compartment. The connection member 20 may not be attached to the intermediate chambers 26 over which it extends. The connection member 20 may be adapted to and added to a variety of airbag cushion designs including vertical or semi-vertical chambers to create a convex profile in the inflated airbag cushion. The connection member 20 may be configured so that at least one of the tethered chambers protrudes in to the occupant compartment. The airbag cushion 12 may be configured so that when it is inflated the connection member 20 is located between the airbag and the side of the passenger compartment so that contact between the occupant 18 and the connection member 20 is prevented. The connection member may be connected to the perimeter portions of the respective inflatable chambers. The connection member may form a sewn attachment between perimeter portions of the inflatable chambers.

The airbag cushion 12 according to any embodiment, including those shown in FIGS. 2 and 3, may be used in conjunction with an occupant protection system. The occupant protection system may include a control unit, one or more sensors used to detect impacts which are known in the art, a gas generator and one or more airbags or other safety devices. As shown in FIG. 4, the airbags that are part of the occupant protection system may be a head-side airbag 12 and a frontal airbag 30. In the event of a frontal impact or frontal offset impact event the tethered protruding chambers 22, 24 of the airbag cushion 12 are positioned between the occupant 18 and the vehicle A-pillar 15. The tethered protruding chambers 22, 24 of the airbag cushion 12 may guide the occupant 18 toward a frontal airbag 30 and away from the vehicle A-pillar 15. This arrangement may allow an occupant protection system including both a head-side airbag 12 with a protruding chamber and a frontal airbag 30 to better protect an occupant 18 from contact with a vehicle A-pillar 15 and to absorb more energy in a frontal impact or offset frontal impact event than a head-side airbag or frontal airbag alone.

In another embodiment, the airbag cushion 12 depicted in FIG. 4 may be utilized individually, and not as part of an occupant protection system.

The present disclosure has been described with reference to exemplary embodiments, however persons skilled in the art will recognize that changes may be made in form and detail without departing from the spirit and scope of the disclosed subject matter. For example, although different exemplary embodiments may have been described as including one or more features providing one or more benefits, it is contemplated that the described features may be interchanged with one another or alternatively be combined with one another in the described exemplary embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is important to note that the construction and arrangement of the head side airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An airbag device configured to deploy along an interior side of a passenger compartment of a vehicle, comprising:
   a gas generator;
   an inflatable airbag comprising a plurality of inflatable chambers configured to be inflated by the gas generator;
   wherein a first inflatable chamber is tethered to at least a second inflatable chamber by a connection member;
   wherein the airbag is configured so that when the airbag is inflated the connection member restrains the separation of the first and second inflatable chambers and forces at least one of the inflatable chambers inboard so that the plurality of inflatable chambers form a convex profile along a plane perpendicular to the side of the passenger compartment; and
   wherein the connection member extends generally in the longitudinal direction and parallel to the interior side of the passenger compartment of the vehicle so that the first and second inflatable chambers pivot generally horizontally to form the convex profile.

2. The airbag device of claim 1, wherein the airbag is configured to inflate into a position such that the connection member is located between the airbag and the side of the passenger compartment and contact between the connection member and a vehicle occupant is prevented.

3. The airbag device of claim 1, wherein the airbag is configured to inflate such that the at least one inboard inflatable chamber is positioned between a vehicle occupant and an A-pillar of the vehicle.

4. The airbag device of claim 1, wherein the connection member is attached to a first seam forming a portion of the perimeter of the first inflatable chamber and a second seam forming a portion of the perimeter of the second inflatable chamber.

5. The airbag device of claim 4, wherein the st and second seams extend in a generally vertical direction.

6. The airbag device of claim 1, wherein the airbag is a head-side airbag configured to be stored along a roof of the vehicle so that the airbag deploys downwardly towards a vehicle occupant.

7. The airbag device of claim 1, wherein the connection member comprises a sewn attachment joining the perimeter portions of the first and second inflatable chambers.

8. An occupant protection system, comprising:
   a head-side airbag; and
   a gas generator;
   wherein the head-side airbag comprises a plurality of inflatable chambers configured to be inflated by the gas generator;
   wherein a first inflatable chamber is tethered to at least a second inflatable chamber by a connection member;
   wherein the head-side airbag is configured so that when the head-side airbag is inflated the connection member restrains the separation of the first and second inflatable chambers and forces at least one of the inflatable chambers inboard so that the plurality of inflatable chambers form a convex profile along a plane perpendicular to the side of the passenger compartment; and
   wherein the connection member extends generally in the longitudinal direction and parallel to the interior side of the passenger compartment of the vehicle so that the first and second inflatable chambers pivot generally horizontally to form the convex profile.

9. The occupant protection system of claim 8, wherein the head-side airbag is configured to inflate such that the at least one inboard inflatable chamber is positioned between a vehicle occupant and an A-pillar of the vehicle.

10. The occupant protection system of claim 8, wherein the head-side airbag is configured such that the at least one inboard inflatable chamber is positioned to guide a vehicle occupant away from an A-pillar of the vehicle and toward the frontal airbag.

11. The occupant protection system of claim 8, wherein the tethered first and second inflatable chambers is separated by one or more intermediate chambers to form the convex profile.

12. The airbag device of claim 8, wherein the connection member comprises a sewn attachment joining the perimeter portions of the first and second inflatable chambers.

13. An airbag device configured to deploy along an interior side of a passenger compartment of a vehicle, comprising:
   a gas generator;
   an inflatable airbag comprising a forward inflatable chamber and a rearward inflatable chamber configured to be inflated by gas provided by the gas generator;
   wherein a forward inflatable chamber is tethered to at least a rearward inflatable chamber by a connection member;
   wherein the forward and rearward inflatable chambers extend generally parallel in the generally vertical direction so that when the airbag is inflated the connection member restrains the separation of the forward and rearward inflatable chambers to form a convex profile along a plane perpendicular to the side of the passenger compartment, and
   wherein the connection member extends generally in the longitudinal direction of the vehicle so that the chambers pivot generally horizontally to form the convex profile.

14. The airbag device of claim 13, wherein the connection member is not attached to an intermediate inflatable chamber located between the forward and rearward inflatable chambers.

15. The airbag device of claim 13, wherein the airbag includes a plurality of intermediate inflatable chambers located between the forward and rearward inflatable chambers.

16. The airbag device of claim 13, wherein the airbag is configured to inflate into a position such that the connection member is located between the airbag and the side of the passenger compartment and contact between the connection member and a vehicle occupant is prevented.

17. The airbag device of claim 13, wherein the connection member is attached to a seam forming a perimeter of the forward inflatable chamber and a seam forming a perimeter of the rearward inflatable chamber.

18. The airbag device of claim 13, wherein the connection member comprises a sewn attachment joining the perimeter portions of the first and second inflatable chambers.

* * * * *